United States Patent [19]
Mill

[11] Patent Number: 5,280,689
[45] Date of Patent: Jan. 25, 1994

[54] COMPOSITE CLADDING PANEL

[76] Inventor: Peter A. D. Mill, 169 Stewart St., Ottawa, Ontario, Canada, K1N 6J8

[21] Appl. No.: 803,312

[22] Filed: Nov. 14, 1991

[30] Foreign Application Priority Data

Nov. 14, 1990 [CA] Canada ................................. 2030011

[51] Int. Cl.$^5$ ........................... E04B 2/02; E04C 1/00
[52] U.S. Cl. ..................................... 52/309.9; 52/235;
52/169.14; 52/314; 52/806; 52/809; 52/811;
52/785
[58] Field of Search ................ 52/309.4, 309.8, 309.9,
52/309.11, 309.12, 309.13, 309.14, 235, 806,
809, 811, 408, 169.14, 314, 268, 269, 785

[56] References Cited

U.S. PATENT DOCUMENTS

| | | | |
|---|---|---|---|
| 2,298,983 | 10/1942 | Stabe | 52/408 |
| 2,578,600 | 12/1951 | Rose | 52/309.4 X |
| 2,730,772 | 1/1956 | Jones | 52/309.9 X |
| 2,861,525 | 11/1950 | Curtis | 52/408 |
| 3,378,969 | 4/1968 | Larger | 52/235 |
| 3,424,647 | 1/1969 | Callahan et al. | 52/169.14 X |
| 4,147,004 | 4/1979 | Day et al. | 52/309.1 X |
| 4,198,454 | 4/1980 | Norton | 52/806 X |
| 4,224,773 | 9/1980 | Schworer . | |
| 4,310,587 | 1/1982 | Beaupre | 52/88 X |
| 4,312,908 | 1/1982 | Jasperson . | |
| 4,315,392 | 2/1982 | Sylvest | 52/408 X |
| 4,564,554 | 1/1986 | Mikusi . | |
| 4,698,278 | 10/1987 | Prang . | |

FOREIGN PATENT DOCUMENTS

| | | | |
|---|---|---|---|
| 0624009 | 7/1961 | Canada | 52/309.8 |
| 0095407 | 9/1986 | European Pat. Off. . | |

Primary Examiner—Carl D. Friedman
Assistant Examiner—Robert Canfield
Attorney, Agent, or Firm—Marks & Clerk

[57] ABSTRACT

A composite cladding panel for application primarily to the exterior of buildings, comprises a core layer of lightweight insulating foam proving a thermal insulation of at least R10, said insulating foam being encapsulated in a layer of fluid impermeable material to inhibit the passage of vapor and gasses therethrough, an outer sheet consisting of at least one finishing panel adhering to an outer surface of said core layer, and an inner structural insulating sheet, thermally compatible with the expansion characteristics of said outer sheet, adhering to an inner surface of said core layer to provide structural integrity to said panel and facilitate attachment thereof to a building structure. The panel is of lightweight construction and useful especially in the environmentally efficient finishing of buildings.

8 Claims, 1 Drawing Sheet

COMPOSITE CLADDING PANEL

FIELD OF THE INVENTION

This invention relates construction materials, and more particularly to a composite cladding panel for application primarily to the exterior of buildings.

BACKGROUND OF THE INVENTION

Modern large buildings generally consist of a basic load bearing structure supporting the exterior facade. This should be lightweight, durable, of pleasing appearance and compatible with overall environmental objectives for the interior of the building. Many existing buildings in North America are in urgent need of refurbishment because their facades do not meet current environmental objectives, and in some cases are creating a hazard to the public due to the tendency of parts of the facade to become detached from the basic building structure, crashing into the street below.

Some buildings are finished with glass panels. Such panels have a pleasing appearance, but provide relatively little insulation, and the fitting of the underlying insulation can be time-consuming. Furthermore, fiberglass insulation, which is currently used, can be a health hazard. Glass panels cannot be economically retrofitted onto existing buildings since the entire facade has to be stripped away.

Some buildings are finished in polished stone, such as granite or marble. This also has a pleasing appearance, but is a relatively limited thermal insulation value. Mounting the stone panels can be difficult, and in some cases there has been a tendency for the joints to fail over time, causing the need for refurbishment of the building. The panels are generally large, and in order to have sufficient strength to avoid breakage must be heavy and are therefore difficult to handle. The consequences of such a panel becoming detached from a building due to joint failure can be fatal.

An object of the present invention is to provide a composite cladding panel intended to alleviate the aforementioned problems associated with the prior art.

SUMMARY OF THE INVENTION

According to the present invention there is provided composite cladding panel for application primarily to the exterior of buildings, comprising a core layer of lightweight insulating foam proving thermal insulation of at least R8 per inch, said core being sandwiched between layers of fluid impermeable material to inhibit the passage of vapor and gasses therethrough; an outer sheet consisting of at least one finishing panel adhering to an outer surface of said core layer; a rigid inner structural sheet, thermally compatible with the expansion characteristics of said outer sheet, adhering to an inner surface of said core layer to provide structural integrity to said panel; and anchoring means to permit attachment of said panel to a building structure.

The thermal resistance of the foam, which is preferably phenyl formaldehyde foam, but may also be polyuretahne foam, is preferably at least R10, and most desirably about R20–R 30 per inch.

The panel can be used indoors, in which case the finishing panel can be standard dry wall. However, more often the panel will be used on the outer facade of a building, in which case generally there will be a plurality of contiguous weatherproof panels, such as polished granite or marble tile.

The structural sheet is preferably a honeycombed fiberglass or aluminum panel, to which is attached by means of epoxy resin protruding fiberglass angle fittings for attachment to the building structure. When the panel is used indoors, the standard dry wall can be replaced by ceramics or bricks, etc.

The impermeable material is preferably modified bitumen with latex and fire-retardant additives. The bitumen is made by Penkott under trade designation TMP (O series). This is a two-part chemically bonded bitumen, which is environmentally stable and not subject to outgassing etc.

BRIEF DESCRIPTION OF THE DRAWINGS

The invention will now be described in more detail, by way of example only, with reference to the accompanying drawings, in which.

DESCRIPTION OF PREFERRED EMBODIMENTS

Figure 1:
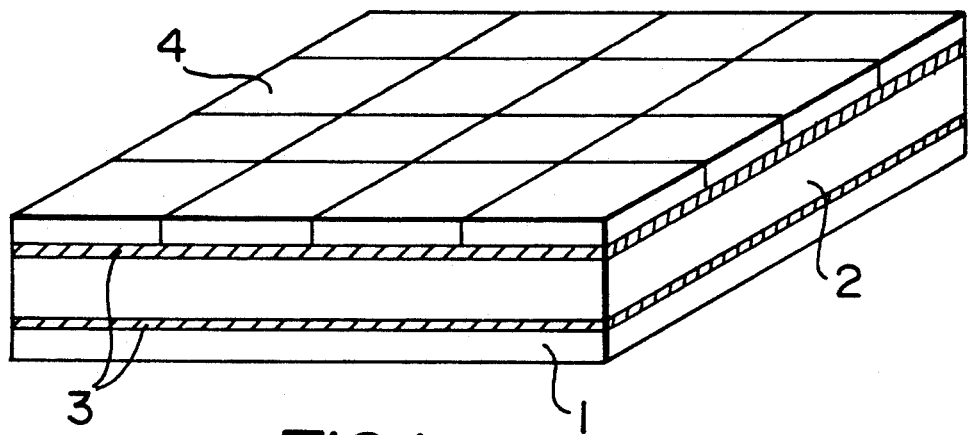
FIG. 1 is an oblique view of a composite panel in accordance with the invention.
Figure 2:
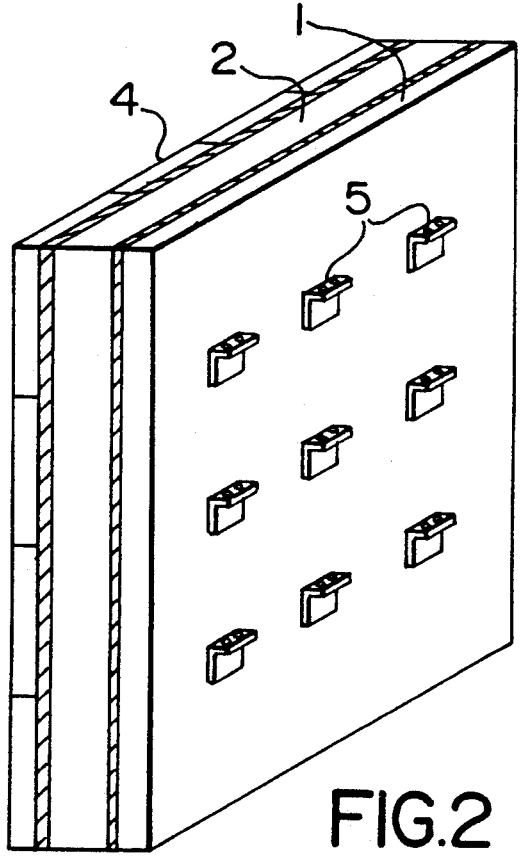
FIG. 2 is an oblique view showing the rear of a composite panel in accordance with the invention.
Figure 3:
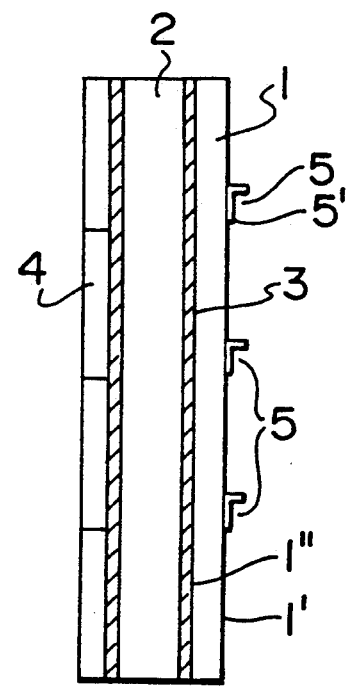
FIG. 3 is an end view of the composite panel.

The cladding panel comprises a structural backing layer 1 of 1 inch honeycombed fiberglass board. The honeycomb board 1 is lightweight, strong and has good thermal stability on the outside due to the low thermal coefficient of expansion of the fibreglass. The board is manufactured by Railtech Ltd. of Montreal. Alternatively, the fiberglass can be replaced by aluminum.

To the board 1 is adhered a block of 8" thick closed cell phenyl formaldehyde foam of R30 insulation value. The phenyl formaldehyde foam is sandwiched between in two layers of modified bitumen with latex and fire-retardant additives. The modified bitumen has an adhesion strength at 6 mm. of 4 to 5 lbs. per square inch and an elasticity of 300%. The bitumen layer 3 also serves as the adhesive attaching the foam block 2 to the structural board 3.

On the outer surface of the composite panel is arranged a plurality of contiguous polished granite tiles 4. These are ¼ to ⅜ of an inch thick and 8 to 24 inches square. The tiles are lightweight and firmly attached to the closed cell foam by the bitumen layer 3. The tiles gives a solid, pleasing appearance.

The composite panel is attached to the building structure by means of protruding fiberglass angle fittings 5. These have their long sides 5' adhered to the board 1 by means of a two-part epoxy resin to the rear of the fiberglass backing board 1. For added strength, the angle fittings 5 can extend part-way into the board 1, although to maintain a good thermal barrier it is preferred that they be glued onto the rear surface of the board 5. These can be attached to the building structure in a conventional manner. The shorter arms of the angle fittings are bolted onto the building structure to hold the composite panel in place.

The composite panel according to the invention has the advantage of being lightweight. It can therefore be readily manoeuvered into position, and it puts considerably less strain on the anchoring fittings than conventional facades. The granite exterior is extremely resistant to weather, and coupled with the overall structure of the panel provides an excellent fire-retardant finish.

The composite panel will generally act as a 1 to 2 hour fire retardant.

The product is environmentally stable with no outgassing. It provides high thermal insulation and good sealing qualities, which coupled with modern environmental control systems enhance the comfort, health and safety levels of occupants within the building.

The lightweight rear structural board gives structural strength to the composite panel, but at the same time evenly distributes the weight into the building structure. The anchoring fittings 5, in addition to fiberglass angle members, can be made of metal studs, timber studs, and the like.

The backing board 5 has a coefficient of thermal expansion compatible with the facing tiles 4. Consequently, as the temperature changes, the foam core and bitumen protective layer being flexible, the composite panel maintains its integrity. Furthermore, since each composite panel contains a plurality of relatively small tiles, any variation in the coefficient of thermal expansion can be taken up, at least partly by expansion gaps between the tiles and as a result the stresses on the individual tiles are reduced. The composite panel, with regard to appearance, therefore has many of the advantages of a large granite block, but without the disadvantages inherent in attaching such a block to a building. The solid rigid appearance is maintained due to the composition of the composite panel, but the inherent flexibility of the core layer makes the panel much more tolerant of changing environmental conditions.

I claim:

1. A prefabricated composite cladding panel for application to the exterior of buildings, comprising as an integral and separate unit: a core layer of lightweight insulating foam providing thermal insulation of at least R8 per inch; first and second layers of fluid impermeable material between which said core layer is sandwiched, said first and second layers inhibiting the passage of vapor and gasses through said core layer and comprising a modified bitumen; an outer sheet adhered to said first layer and comprising a plurality of contiguous finishing tiles; a rigid inner structural sheet of honeycomb board thermally compatible with expansion characteristics of said outer sheet adhered to said second layer to provide structural integrity to said panel; and anchoring means protruding from said honeycomb board to permit attachment of said panel to the exterior of a building structure.

2. A composite cladding panel as claimed in claim 1 wherein said core is made of closed cell foam.

3. A composite cladding panel as claimed in claim 1 wherein said core is made of closed cell phenyl formaldehyde foam.

4. A composite cladding panel as claimed in claim 1 wherein said core is made of closed cell polyurethane foam.

5. A composite cladding panel as claimed in claim 3 wherein said bitumen is modified with a latex additive.

6. A composite cladding panel as claimed in claim 5 wherein the bitumen further includes a fire-retardant additive.

7. A composite cladding panel as claimed in claim 3 wherein said first and second fluid impermeable layers have a 300% elasticity.

8. A composite cladding panel as claimed in claim 1 wherein said at least one finishing panel comprises at least one granite tile.

* * * * *